United States Patent
Tanaka

[11] Patent Number: 5,900,612
[45] Date of Patent: May 4, 1999

[54] BAR CODE READING OPTICAL APPARATUS

[75] Inventor: Kiyoshi Tanaka, Kanagawa, Japan

[73] Assignee: Sony Corporation, Tokyo, Japan

[21] Appl. No.: 08/806,407

[22] Filed: Feb. 26, 1997

[30] Foreign Application Priority Data

Feb. 27, 1996 [JP] Japan .................................... 8-065260

[51] Int. Cl.$^6$ ...................................................... G06K 7/10
[52] U.S. Cl. ...................................... 235/457; 235/462.35
[58] Field of Search ................................ 235/457, 462.35

[56] References Cited

U.S. PATENT DOCUMENTS 5,481,095  1/1996  Mitsuda et al. ......................... 235/457

FOREIGN PATENT DOCUMENTS

0669592 A1  8/1995  European Pat. Off. .

Primary Examiner—Harold I. Pitts
Attorney, Agent, or Firm—Hill & Simpson

[57] ABSTRACT

In a bar code reading optical apparatus including a semiconductor laser and a prism both mounted on a photodiode IC so that emitted light from a semiconductor laser is reflected by a reflective plane of a prism and signal light from a bar code to be read out enters in and detected by a photodiode, a numerical aperture conversion hologram is provided in a light path of the emitted light reflected by the reflective plane of the prism to adjust the numerical aperture of a converging lens so that the numerical aperture for the emitted light be smaller than the numerical aperture for the signal light. The numerical aperture conversion hologram may be omitted by shaping the reflective plane of the prism into a concave plane to adjust the numerical value for the emitted light smaller than the numerical value for the signal light.

8 Claims, 3 Drawing Sheets

BAR CODE READING OPTICAL APPARATUS

BACKGROUND OF THE INVENTION

1. Field of the Invention

This invention relates to a bar code reading optical apparatus.

2. Description of the Related Art

Conventional bar code reading systems have been made by assembling individually prepared parts including a light source (for example, a semiconductor laser) and an optical detector (for example, a photodiode). Therefore, they inevitably had dimensions determined by sizes of the parts, and could not be miniaturized beyond the limit imposed by the parts. Moreover, although assembled parts of conventional bar code reading systems need relative positional adjustment of a high accuracy smaller than 10 μm, the positional relation among respective parts is liable to change with time after assembly, and such a system is not fully reliable.

A proposal to overcome the problem is a bar code reading complex apparatus in form of hybrid integration of a laser chip, a prism and other elements on a photodiode IC as shown in FIG. 1.

In the bar code reading complex optical apparatus shown in FIG. 1, mounted on a photodiode IC 101 are a prism 102 covering its photodiode PD' and a block 103 carrying a semiconductor laser 104 and located adjacent the prism 102. The prism 102 has a slope plane 102b angled by 45° from its bottom place 102a. Formed on the slope plane 102b is a reflective film 105 of a dimension fully covered by a spot made by emitted light L' from a semiconductor laser 104 on the slope plane 102b.

In the bar code reading complex optical apparatus, the emitted light L' from the semiconductor laser 104 is reflected by the reflective film 105 on the slope plane 102b of the prism 102, and then converged by a converging lens (not shown) onto a bar code to be read. The signal light from the bar code returns to the bar code reading complex optical apparatus through the converging lens, then enters the photodiode PD', and is converted into an electrical signal there. Thus, the bar code is read out.

Although the bar code reading complex optical apparatus shown in FIG. 1 permits miniaturization, reduction in weight, omission of the job for positional adjustment, and increases the reliability, it involves some problems shown below.

In order to elevate the level of the signal light from the bar code, the numerical aperture of the converging lens for the signal light is made larger than the numerical aperture of the converging lens for the emitted light L'. In this respect, the bar code reading complex optical apparatus shown in FIG. 1 relies on making the reflective film 105 on the slope plane 102b of the prism 102 sufficiently small than the spot of the emitted light L' on the slope plane 102b. Therefore, part of the emitted light L' not reflected by the reflective film 105 does not contribute to scan beams. That is, the efficiency of use of the emitted light L' was low in the proposed system. In other words, the proposed system required a large amount of power for the semiconductor laser 104 to obtain scan beams of a given intensity. Moreover, not only unuseful is the part of the emitted light L' from the semiconductor laser 104 not reflected by the reflective film 105, but also obstructive is it as producing stray light causing a noise.

Considering that the use of the reflective film 105 needs a high cost to make it on the slope plane 102b of the prism 102 and needs a complicated job for establishing and maintaining relative positional accuracy between the semiconductor laser 104 and the reflective film 105, it may be possible to use a bifocal lens or a hologram having both an aperture for emitted light and another aperture for signal light in lieu of the reflective film 105. Then, the stray light problem can be greatly improved, but the efficiency of use of the emitted light L' from the semiconductor laser 104 still remains low. Moreover, when the bifocal lens or the hologram is used, part of the emitted light L' from the semiconductor laser 104 other than the part contributing to scan beams makes an undesired spot called garbage spot. This is shown in FIG. 2 in which numeral 107 refers to the bifocal lens, 108 to a scan spot, and 109 to a garbage spot.

OBJECTS AND SUMMARY OF THE INVENTION

It is therefore an object of the invention to provide a bar code reading optical apparatus that can efficiently use emitted light from a light emitting device and can greatly decreases stray light and garbage spots.

According to a first aspect of the invention, there is provided a bar code reading optical apparatus including:
   a base body;
   a light emitting device and an optical detector device provided on the base body; and
   a prism provided on the base body, wherein emitted light from the light emitting device is reflected by a reflective plane of the prism and signal light from a bar code to be read out enters in the optical detector device, comprising:
      a hologram provided in a light path of the emitted light reflected by the reflective plane of the prism; and
      the hologram adjusting the numerical aperture of a converging lens for converging the emitted light reflected by the reflective plane of the prism onto the bar code so that the numerical aperture for the emitted light be smaller than the numerical aperture for the signal light.

According to a second aspect of the invention, there is provided a bar code reading optical apparatus including:
   a base body;
   a light emitting device and an optical detector device provided on the base body; and
   a prism provided on the base body, wherein emitted light from the light emitting device is reflected by a reflective plane of the prism and signal light from a bar code to be read out enters in the optical detector device, comprising:
      the reflective plane of the prism defining a concave plane that adjusts the numerical aperture of a converging lens for converging the emitted light reflected by the reflective plane of the prism onto the bar code so that the numerical aperture for the emitted light be smaller than the numerical aperture for the signal light.

In the present invention, the reflective plane of the prism typically has a dimension large enough to contain at least the spot of light made on the prism by the emitted light from the light emitting device.

Typically, the base body is a semiconductor substrate, the light emitting device is a semiconductor laser formed on the semiconductor substrate, and the optical detector device is a photodiode formed on the semiconductor substrate.

According to the invention having the above construction, since the numerical aperture of the converging lens is adjusted by the hologram or the concave reflective plane so that the numerical aperture for the emitted light be smaller than the numerical aperture for the signal light. Therefore, the reflective plane of the prism may be large enough to contain the spot of light made on the prism by the emitted light. As a result, the emitted light from the light emitting device can be used effectively, and stray light and garbage spots can be reduced significantly.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
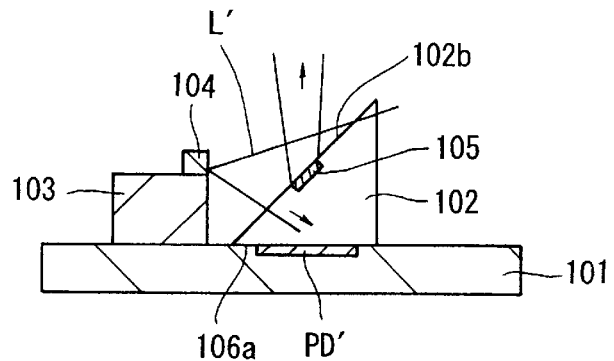
FIG. 1 is a schematic diagram showing a proposed bar code reading complex optical apparatus.

Embodiment of the invention are described below with reference to the drawings. In all figures showing embodiments of the invention, the same or equivalent parts or elements are labelled with common reference numerals.

Figure 3:
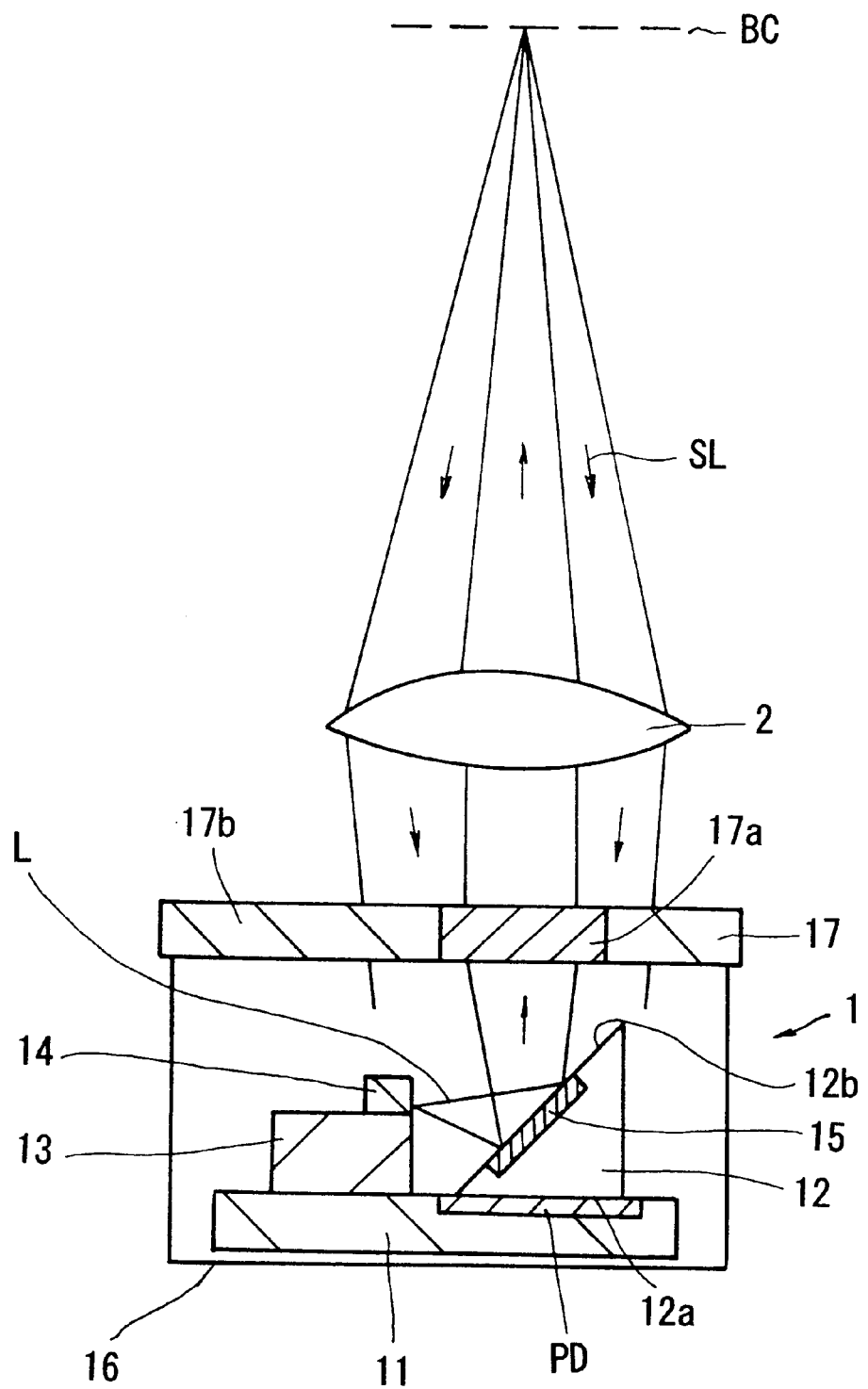
FIG. 3 is a schematic diagram showing a bar code reading system according to a first embodiment of the invention.

FIG. 3 is a bar code reading system taken as a first embodiment of the invention.

As shown in FIG. 3, the bar code reading system according to the first embodiment includes a bar code reading optical apparatus 1 and a converging lens 2 for converging emitted light from the bar code reading complex optical apparatus 1 onto a bar code BC to be read out.

In the bar code reading complex optical apparatus 1, mounted on a photodiode IC 11 having a signal light detecting photodiode PD is a prism 12 made of optical glass, for example, to cover the photodiode PD. Further mounted on the photodiode IC 11 is a block 13 made of a Si chip, for example, and carrying a semiconductor laser 14 to be adjacent to the prism 12.

The photodiode IC 11 is made by incorporating a drive circuit for driving the semiconductor laser 14, an incoming signal amplifying circuit (not shown) and other elements, in addition to the photodiode PD, on a Si substrate or a GaAs substrate, for example.

The prism 12 is bonded on the photodiode IC 11 by an epoxy resin-based adhesive or a silicone resin-based adhesive, for example. On the other hand, the block 13 supporting the semiconductor laser 14 is mounted by die-bonding the block 13 onto a die pad (not shown) formed on the photodiode IC 11.

Usable as the semiconductor laser 14 is a GaInP/AlGaInP semiconductor laser or a GaAs/AlGaAs semiconductor laser, for example.

Since the semiconductor laser 14 is typically mounted to locate its junction lower, the block 13 serves to locate the semiconductor laser 14 sufficiently high from the surface of the photodiode IC 11 in order to prevent that the emitted light L from the semiconductor laser 14 is reflected by the surface of the photodiode IC 11 and becomes stray light.

The prism 12 defines a slope plane 12b angled by a predetermined value, for example 45°, from the bottom plane 12a of the prism 12. Formed on the slope plane 12b is a reflective film 15 in form of a dielectric multi-layer film, for example. The reflective film 15 has a dimension large enough to entirely contain the spot of light made by emitted light L from the semiconductor laser 14 on the slope plane 12b, also taking into account the assembling accuracy of the prism 12 and the block 13 with the semiconductor laser 14 on the photodiode IC 11. The reflective film 15 may be either a 100% total reflective film or a half mirror.

The photodiode IC 11, prism 12, block 13 and semiconductor laser 14 are contained in a package 16. Usable as the package 16 are a resin mold package, ceramic package, metal package, acrylic resin package, for example.

Attached to a lid of the package 16 is a hologram 17 for converting the numerical aperture (NA). The NA conversion hologram 17 that may be made by etching glass, for example, is configured to decrease NA of the converging lens 2 for emitted light L from the bar code reading complex optical apparatus 1 sufficiently smaller than NA of the converging lens 2 for signal light from the bar code BC. Numeral 17a denotes the NA converting portion.

Next explained is operation of the bar code reading system according to the first embodiment having the above construction.

The entirety of the emitted light L from the semiconductor laser 14 is reflected by the reflective film 15 on the slope plane 12b of the prism 12 upwardly, namely, toward the NA conversion hologram 17. Since all of the emitted light L is reflected by the reflective film 15, no stray light occurs. The emitted light L entering in the NA conversion hologram 17 exits through apertures with a sufficiently small NA under control of the NA conversion hologram 17. The emitted light L from the NA conversion hologram 17 is converged by the converging lens 2 onto the bar code BC to be read out.

Signal light SL from the bar code BC enters the converging lens 2 over its entire dimension. The signal light SL passes through the converging lens 2, then passes through the NA conversion hologram 17 of the bar code reading complex optical apparatus 1, thereafter enters in the photodiode PD on the photodiode IC 11 via the prism 12 and other elements, and is converted into an electrical signal there. Thus, the bar code BC is read out.

According to the first embodiment explained above, the emitted light L from the semiconductor laser 14 behaving as the light source of the bar code reading complex optical apparatus 1 is entirely reflected by the reflective film 15 on the slope plane 12b of the prism 12 and entirely used as scan beams. Therefore, the embodiment can greatly increase the efficiency of use of the emitted light L and can effectively use the emitted light L. As a result, the embodiment can largely reduce the power consumption of the semiconductor laser 14. Moreover, the embodiment can largely reduce stray light and garbage spots causing noise.

Figure 4:
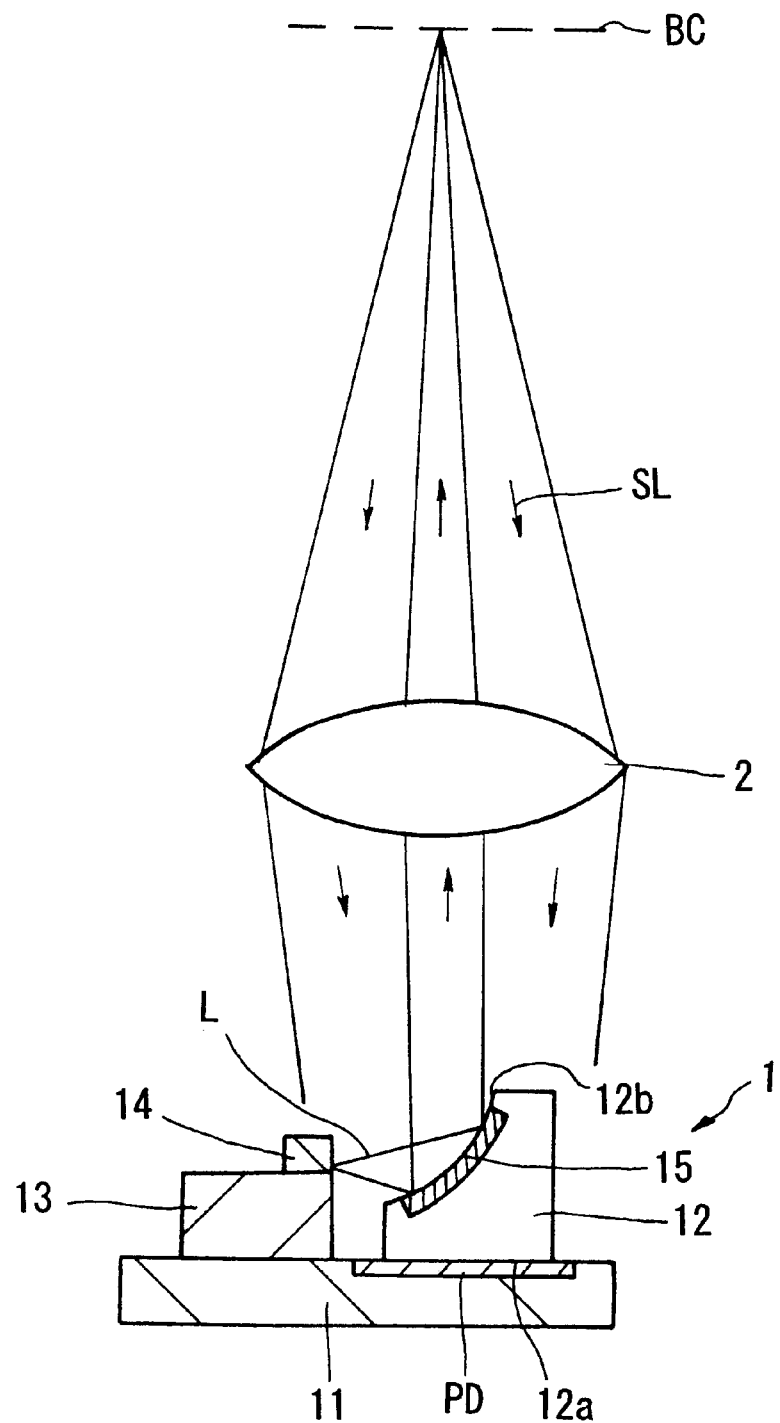
FIG. 4 is a schematic diagram showing a bar code reading system according to a second embodiment of the invention.

FIG. 4 shows a bar code reading system taken as a second embodiment of the invention.

The bar code reading system according to the second embodiment uses a bar code reading optical apparatus 1 having a different construction from that of the first embodiment.

That is, as shown in FIG. 4, the bar code reading complex optical apparatus 1 in the bar code reading system according to the second embodiment is the same as that of the first embodiment in that the prism 12 is mounted on the photodiode IC 11 so as to cover the photodiode PD and the block 13 supporting the semiconductor laser 14 is mounted adjacent to the prism 12; however, it is different in that the slope plane 12b of the prism 12 defines a concave plane (for example, cylindrical plane) with a predetermined curvature and the reflective film 15 is formed on the concave slope plane 12b. The reflective film 15 has a dimension large enough to entirely contain the spot of light made by emitted light L from the semiconductor laser 14 on the slope plane 12b, also taking into account the assembling accuracy of the prism 12 and the block 13 with the semiconductor laser 14 on the photodiode IC 11. The curvature of the slope plane 12b of the prism 12 is chosen to convert NA of the converging lens for emitted light L from the semiconductor laser 14 into a value sufficiently smaller than NA of the converging lens 2 for signal light SL from the bar code BC. The reflective film 15 may be either a 100% total reflective film or a half mirror.

The prism 12 having the slope plane 12b with a curvature can be made by a press mold process, for example. Usable as the material of the prism 12 is optical glass with a low melting point, for example.

Next explained is operation of the bar code reading system according to the second embodiment having the above construction.

Figure 2:
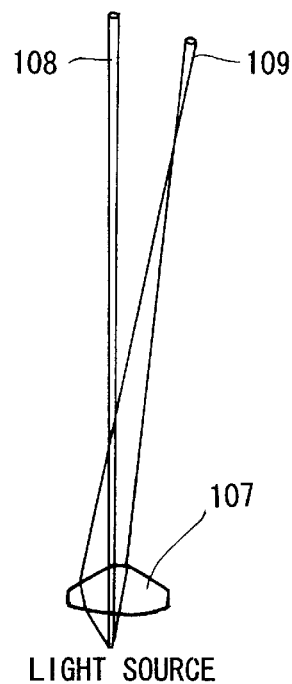
FIG. 2 is a schematic diagram for explaining problems with the proposed bar code reading complex optical device.

The entirety of the emitted light L from the semiconductor laser 14 enters the concave reflective film 15 on the slope plane 12b of the prism 12. The emitted light L entering the concave reflective film 15 is reflected by the concave reflective film 15 with NA converted into a sufficiently small value, in the upper direction in FIG. 2, namely, toward the NA conversion hologram 17. After that, the light is converged by the converging lens 2 onto the bar code BC to be read out. In this process, the emitted light L is entirely reflected by the reflective film 15, and no stray light occurs.

Signal light SL from the bar code BC enters the converging lens 2 over its entire dimension. The signal light SL passes through the converging lens 2, thereafter enters the photodiode PD on the photodiode IC 11 of the bar code reading complex optical apparatus 1, and is converted into an electrical signal there. Thus, the bar code BC is read out.

According to the second embodiment explained above, the emitted light L from the semiconductor laser 14 behaving as the light source of the bar code reading complex optical apparatus 1 is entirely reflected by the concave reflective film 15 on the slope plane 12b of the prism 12 and entirely used as scan beams. Therefore, the second embodiment can greatly increase the efficiency of use of the emitted light L and can effectively use the emitted light L. As a result, like the first embodiment, also the second embodiment can largely reduce the power consumption of the semiconductor laser 14. Moreover, the embodiment can largely reduce stray light and garbage spots causing noise.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

Figure 5:
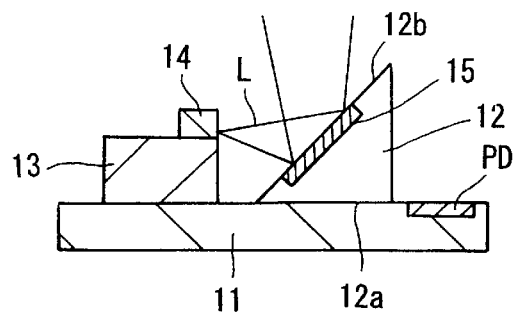
FIG. 5 is a schematic diagram for explaining another embodiment of the invention.

For example, the optical systems used in the bar code reading system according to the first and second embodiments are in-line optical systems in which the photodiode PD is located on the optical axis of the converging lens 2, the invention may use an off-axis optical system in which the photodiode PD is offset from the optical axis of the converging lens 2. FIG. 5 shows an example using such an off-axis optical system combined in the first embodiment. Also the example of FIG. 5 can promise the same advantages as those of the first and second embodiments, namely, the effective use of the emitted light L from the semiconductor laser 14, for example, by using a bifocal lens or a hologram having both an aperture for incident light and an aperture for emitted light and by adjusting NA after conversion by the NA conversion hologram 17 to coincide with NA of these optical elements for emitted light.

As described above, in the bar code reading complex optical apparatus according to the invention, since the numerical aperture of the converging lens for converging emitted light reflected from the reflective plane of the prism onto a bar code is adjusted by the hologram or the concave reflective plane to make the numerical aperture for the emitted light smaller than the numerical aperture for signal light, the emitted light from the light emitting apparatus can be used effectively, and stray light and garbage spots can be greatly reduced.

What is claimed is:

1. A bar code reading apparatus, comprising:
    a base body;
    a converging lens;
    a light emitting device and an optical detector device provided on said base body;
    a prism provided on said base body and positioned on said detector device, wherein emitted light emitted from said light emitting device is reflected by a reflective plane of said prism toward a bar code and a signal light reflected back from the bar code to be read returns into said optical detector device; and
    a hologram provided in a light path of said emitted light reflected by said reflective plane of said prism,
    wherein,
        said hologram converts the numerical aperture of said converging lens for converging emitted light reflected from said reflective plane of said prism onto said bar code so that the numerical aperture for said emitted light is smaller than the numerical aperture for said signal light.

2. The bar code reading complex optical apparatus according to claim 1, wherein said reflective plane of said prism has a dimension large enough to contain at least a spot of light made on said prism by said emitted light from said light emitting device.

3. The bar code reading complex optical apparatus according to claim 1, wherein said base body is a semiconductor substrate, said light emitting device is a semiconductor laser formed on said semiconductor substrate, and said optical detector device is a photodiode formed on said semiconductor substrate.

4. The bar code reading complex optical apparatus according to claim 1, wherein said reflective plane of said prism comprises a total reflection film.

5. A bar code reading apparatus comprising:
    a base body;
    a converging lens;
    a light emitting device and an optical detector device provided on said base body; and
    a prism provided on said base body,
    wherein,
        emitted light from said light emitting device is reflected by a reflective surface of said prism and a signal light reflected from a bar code to be read out enters into said optical detector device, said reflective surface of said prism comprises a concave surface that adjusts the numerical aperture of said converging lens for converging said emitted light reflected by said reflective plane of said prism onto said bar code so that the numerical aperture for said emitted light be smaller than the numerical aperture for said signal light.

6. The bar code reading complex optical apparatus according to claim 5, wherein said reflective surface of said prism has a dimension large enough to contain at least a spot of light made on said prism by said emitted light from said light emitting device.

7. The bar code reading complex optical apparatus according to claim 5, wherein said base body is a semiconductor substrate, said light emitting device is a semiconductor laser formed on said semiconductor substrate, and said optical detector device is a photodiode formed on said semiconductor substrate.

8. A bar code reading optical apparatus including:

a base body;

a converging lens;

a light emitting device and an optical detector device provided on said base body;

a prism provided on said base body on said optical detector device;

a hologram; and a package containing at least said light emitting device, said prism, said optical detector and said hologram, wherein, emitted light from said light emitting device is reflected by a reflective plane of said prism and signal light from a bar code to be read out enters in said optical detector device, said hologram is provided a light path of said emitted light reflected by said reflective plane of said prism; and said hologram is configured to convert the numerical aperture of said converging lens for converging said emitted light reflected by said reflective plane of said prism onto said bar code so that the numerical aperture for said emitted light be smaller than the numerical aperture for said signal light.

* * * * *